US 6,735,441 B1

(12) United States Patent
Turgeon et al.

(10) Patent No.: US 6,735,441 B1
(45) Date of Patent: May 11, 2004

(54) METHODS AND SYSTEMS FOR PROVIDING MOBILE TELECOMMUNICATIONS NETWORK SERVICES IN A ROUTING NODE

(75) Inventors: Joseph Leonard Turgeon, Raleigh, NC (US); Chester C. Fennell, Jr., Apex, NC (US); Larry Gene Slate, Apex, NC (US); Byron C. Bagaasen, Apex, NC (US); Peter Joseph Marsico, Carrboro, NC (US)

(73) Assignee: Tekelec, Calabasas, CA (US)

( * ) Notice: Subject to any disclaimer, the term of this patent is extended or adjusted under 35 U.S.C. 154(b) by 385 days.

(21) Appl. No.: 09/626,590

(22) Filed: Jul. 27, 2000

Related U.S. Application Data
(60) Provisional application No. 60/165,804, filed on Nov. 16, 1999.

(51) Int. Cl.[7] .................................................. H04Q 7/20
(52) U.S. Cl. .................. 455/433; 455/445; 455/560; 379/221.1
(58) Field of Search .................. 455/433, 560, 455/445, 461, 426; 370/465, 466, 467, 469; 379/219, 220.01, 221.1

(56) References Cited

U.S. PATENT DOCUMENTS

| 5,353,331 A | 10/1994 | Emery et al. |
| 5,396,543 A | 3/1995 | Beeson, Jr. et al. |
| 5,583,914 A | 12/1996 | Chang et al. |
| 5,623,532 A | 4/1997 | Houde et al. |
| 5,664,005 A | 9/1997 | Emery et al. |
| 5,805,997 A | 9/1998 | Farris |
| 5,819,177 A | 10/1998 | Vucetic et al. |
| 5,819,178 A | 10/1998 | Cropper |
| 5,832,382 A | 11/1998 | Alperovich |
| 5,845,211 A | 12/1998 | Roach, Jr. |
| 5,850,604 A | 12/1998 | Dufour et al. |
| 5,862,481 A | 1/1999 | Kulkarni et al. |
| 5,890,063 A | 3/1999 | Mills |
| 5,920,820 A | 7/1999 | Qureshi et al. |
| 5,953,663 A | 9/1999 | Maupin et al. |
| 5,978,672 A | 11/1999 | Hartmaier et al. |
| H1895 H | 10/2000 | Hoffpauir et al. |
| 6,137,869 A | 10/2000 | Voit et al. |
| H1921 H * | 11/2000 | Fletcher et al. ............. 455/433 |
| 6,178,181 B1 * | 1/2001 | Glitho ........................ 370/467 |
| 6,411,632 B2 | 6/2002 | Lindgren et al. |
| 6,594,258 B1 | 7/2003 | Larson et al. |

FOREIGN PATENT DOCUMENTS

| WO | WO 00/31556 A1 | 6/2000 |
| WO | WO 00/35153 | 6/2000 |
| WO | WO 00/35155 A1 | 6/2000 |

OTHER PUBLICATIONS

Hamdi et al., "Voice Service Interworking for PSTN and IP Networks," IEEE Communications Magazine, p. 104–111, (May 1999).
"EAGLE: Feature Guide Eagle STP," 910–1225–01 Rev B, Tekelec, P. i–vi; 1–208, (Jan. 1998).
"IP7 Secure Gateway Release 1.0," 910–2046–01 Revision A, Tekelec, p. FN–1–FN–64, (Aug. 1999).
"LSMS: Feature Guide LNP LSMS," 910–1598–01 Rev A, Tekelec, p. i–iv; 1–104, (Jan. 1998).

* cited by examiner

Primary Examiner—Lee Nguyen
(74) Attorney, Agent, or Firm—Jenkins, Wilson & Taylor, P.A.

(57) ABSTRACT

A signal transfer point-like network routing element capable of providing call signaling services required in a mobile communications network is disclosed. A mobile services routing node can be configured to provide the functionality of a Home Location Register (HLR), a Visitor Location Register (VLR), an Equipment Identification Register (EIR), and an Authentication Center (AuC). As such, the mobile services routing node is adapted to receive mobile service related signaling messages, perform the necessary mobile service processing, and route response messages as required.

47 Claims, 9 Drawing Sheets

METHODS AND SYSTEMS FOR PROVIDING MOBILE TELECOMMUNICATIONS NETWORK SERVICES IN A ROUTING NODE

RELATED APPLICATION INFORMATION

This application claims the benefit of U.S. Provisional Patent Application No. 60/165,804, filed Nov. 16, 1999, the disclosure of which is incorporated herein by reference in its entirety.

TECHNICAL FIELD

The present invention relates to call signaling services performed in a mobile telecommunications network, and more particularly to methods and systems for providing such services in a network routing element.

BACKGROUND ART

A typical wireless or cellular telecommunications network, generally indicated by the numeral 100, is illustrated in FIG. 1. Such networks typically employ a number of functional elements or entities including but not limited to: a telecommunication terminal or telephone handset 102, a base station (BS) 104 and associated base station controller (BSC) 106, a mobile switching center (MSC) 108, a gateway MSC (GMSC) 110, a home location register (HLR) 112, a visitor location register (VLR) 114, an equipment identity register (EIR) 116, and an authentication center (AuC) 118. These network elements are communicatively coupled via a variety of communication link types, which in turn may employ a variety of communication protocols. are communicatively coupled via a variety of communication link types, which in turn may employ a variety of communication protocols.

Of particular relevance to the integrated routing node of the present invention are the switching and database type network nodes, mentioned above, that facilitate much of the intelligent network services that are characteristic of modern wireless telecommunication networks. A brief discussion of each of their functions follows.

Mobile switching center (MSC) 108 is the functional entity that represents an automatic packet switching system within a wireless communication network. When such a packet switching system is implemented so as to serve as the interface for user traffic between the cellular network and other public switched networks, the corresponding node is often referred to as a Gateway MSC or GMSC. In general, MSC 108 provides basic switching functionality and coordinates the establishment of calls between wireless end users. The MSC is directly responsible for transmission facilities management, mobility management, and call processing functions. The MSC is typically in direct contact with both base stations (BSs) and with voice and signaling related network nodes. The MSC incorporates switching functions, mobile application functions, and other service logic functions.

Home location register (HLR) 112 is the functional entity that represents the primary database repository of subscriber information used to provide control and intelligence in wireless networks. The term register denotes control and processing center functions as well as the database functions. The HLR is managed by the wireless service provider and represents the "home" database for subscribers who have subscribed to service in a particular geographic area. The HLR contains a record for each "home" subscriber that includes location information, subscriber status, subscribed features, and directory numbers. Supplementary services or features that are provided to a subscriber are ultimately controlled by an HLR. An HLR incorporates database functions, mobile application functions, as well as other service logic functions, and may serve one or more MSCs.

Visitor location register (VLR) 114 is the functional entity that represents the local database, control, and processing functions that maintain temporary records associated with individual network subscribers. A VLR is managed by a wireless service provider and represents a temporary database of "visiting" subscribers that have roamed outside of their home service area. A "roaming" visitor can be a mobile subscriber being served by one of many systems serviced by their wireless service provider or network operator. A roaming visitor can also be a mobile subscriber who is roaming in a non-home, or visited, service area (i.e., a network operated by different service provider). A VLR contains subscriber location, status, and service information that is derived from a roaming subscriber's HLR. A local network MSC accesses a VLR to retrieve information for the handling of calls to and from visiting subscribers. A VLR incorporates database functions, mobile application functions, as well as other service logic functions and may serve one or more MSCs.

Equipment identity register (EIR) 116 is the functional entity that represents the database repository for mobile equipment related information. EIRs are typically used to store information related to electronic serial numbers (ESNs) associated with mobile terminals (e.g., handsets). Such an EIR database implementation could be used to prevent stolen or unauthorized mobile terminals from being activated and used within a wireless network fraudulently.

Authentication center (AuC) 118 is the functional entity that represents the authentication functions used to verify and validate a mobile subscriber's identity. The AuC manages and processes authentication information related to a particular mobile subscriber. Typically, this information consists of encryption and authentication keys as well as complex mathematical algorithms used to prevent fraudulent or unauthorized use of the wireless network. An AuC incorporates database functions used for the authentication keys and authentication algorithm functions.

As indicated in FIG. 1, the above described wireless network elements function together to provide the intelligent network services typically associated with modern wireless telecommunication networks. As such, inter communication between these network elements is a very important issue, and is facilitated at least in part by signaling communication links. In Europe, the signaling protocols for mobile communications are defined in the Global System for Mobile Communications (GSM) standards. Both IS-41 and GSM standards include a mobile application part (MAP) protocol component for performing mobile call signaling functions. Accordingly, as used herein, the term "MAP message" is intended to refer to both IS-41 and GSM MAP messages.

Signaling in a wireless or cellular network is employed to implement a number of call processing operations. The term "call processing" encompasses a wide variety of functions that establish, maintain, and tear down calls to and from mobile subscribers (where a call is defined as a temporary communication between end users for the purpose of exchanging information). Mobile calls include a sequence of events that allocate and assign the resources and signaling channels required to establish a communication connection, with the first event in the sequence typically being call establishment. In general terms, the act of call establishment or call setup in a wireless communications network includes a set of functions that arrange for the connection of cellular calls.

With particular regard to wireless calls, the nature of use dictates that there are essentially two types of calls, mobile-originated and mobile-terminated calls. Mobile-originated calls are those that are placed or originate from a mobile station, while mobile-terminated calls are defined as those calls that are made to a mobile station. Mobile-originated calls are established from a mobile subscriber (MS) (i.e., the calling party) to a telecommunications termination point (i.e., the called party) that can be located in either a wired or wireless telecommunications network. Mobile-terminated calls are established from either a wired or wireless "calling party" telecommunications terminal to a "called party" mobile subscriber.

In addition to providing the infrastructure for basic call setup and teardown operations as mentioned above, wireless signaling is also responsible for providing general mobility management services. Such services enable the communications network to maintain location and mobile subscriber status information so that end users can make and receive such mobile-originated and mobile-terminated calls while moving or roaming from place to place. It should be noted that a mobile-to-mobile call is usually treated as the combination of a mobile-originated call scenario and a mobile-terminated call scenario.

Both mobile-originated and mobile-terminated calls typically make use of the extensive infrastructure and routing facilities that exist within the public switched telephone network (PSTN) to create the connections between the calling and called parties. However, call signaling/connection through direct trunking between mobile switching centers (MSCs) that are in close proximity is sometimes employed for mobile-to-mobile calls. Such local mesh networking architectures are typically used in high traffic areas where there are many mobile subscribers and many mobile-to-mobile calls.

The establishment of a cellular call may involve both IS-41 and traditional Signaling System 7 (SS7) ISDN User Part (ISUP) call control signaling to properly connect the call between parties. IS-41 call processing signaling is used to obtain the location, status, routing, and any special call treatment information about a mobile subscriber to properly complete mobile-terminated calls. It is also used to obtain call treatment and routing information for mobile-originated calls. This signaling is provided by the IS-41 intersystem operations. With regard to intersystem handoff, IS-41 signaling is also used to control the inter-MSC trunks. A more detailed discussion of IS-41 signaling can be found in Mobile Telecommunications Networking With IS-41 by Michael D. Gallagher and Randall A. Snyder, McGraw-Hill Publishing 1997. Traditional call control signaling is used to establish trunks and propagate the call, as well as information about the call, from the calling party to the called party. Call control signaling is generally provided by the out-of-band SS7 ISUP protocol, but can be provided via an in-band multi frequency (MF) type signaling protocol. Depending upon the particular network implementation and service required, signaling can be provided by GSM, IS-41, SS7 ISUP or combination of thereof.

Shown in FIG. 2 is an example of a typical wireless signaling progression associated with registration of a mobile station or handset in a wireless communication network 150. In wireless telecommunication networks, mobile station registration is the process by which a mobile subscriber (MS) is identified to the network. Registration indicates the location and status of the MS to the responsible network functional entities. More specifically, the network entities primarily responsible for maintaining MS location and status information are the VLR and HLR. As indicated in FIG. 2, in many cases, VLR functionality is incorporated directly within an MSC switching node.

With regard to the signaling message flows during the process of MS registration shown in FIG. 2, a mobile subscriber handset 152 sends a signal, requesting a call setup, to a local base station 154. The base station unit 154, with the assistance of base station controller 156, signals the combined MSCNLR entity 158, thereby conveying the call request. The combined MSCNLR 158 then formulates an IS-41 signaling message (e.g., a LocationRequest Invoke message), which is intended to obtain information about the location of the called party, and transmits this message to the called party mobile subscriber's HLR 160. HLR 160 receives the information request message and subsequently responds to MSC/VLR 158 with a new message (e.g., a LocationRequest Return Result message) which contains at least a portion of the information necessary to complete the requested call.

It should be appreciated that the example shown in FIG. 2 is only one of the many signaling related communication operations that are required to facilitate the broad range of functions and user services provided by modern wireless telecommunication networks.

Shown in FIG. 3 is a simplified wireless network 170 that includes a first MSC node 174, a second MSC node 176, a third MSC node 178, and a plurality of wireless service related nodes (e.g., HLRs, EIRs, AuCs). More particularly, network 170 includes a mated pair of HLR nodes, generally indicated by the numeral 180. The MSC and wireless service nodes are typically interconnected via an intermediate SS7 network using an IS-41 communication protocol. It will be appreciated that in the network architecture shown, each of the MSC nodes 174, 176, 178 is connected to the mobile service nodes via a Signal Transfer Point (STP) 182.

Referring to FIG. 4, with regard to the communication of signaling messages between a MSC and an mobile service node, it will be appreciated that an IS-41 mobile signaling message sent from an MSC to a mobile service node typically includes a Message Transport Part (MTP) level 1 component 186, an MTP level 2 component 188, an MTP level 3 component 190, a Signaling Connection Control Part (SCCP) component 192, a Transaction Capabilities Application Part (TCAP) component 194, and an IS-41 Mobile Application Part (MAP) component 196, as generally indicated in FIG. 4. It will be appreciated from the diagram presented in FIG. 4 that an STP deployed in a mobile communications network typically uses only information contained in MTP levels 186 through 190 of a mobile services signaling message to perform the routing necessary to deliver the signaling message to a target destination. In some cases, where global title translation type routing is required, an STP may utilize information contained in the SCCP portion 192 of the signaling packet to make a routing decision. In any event, utilization or processing of signaling message information content above the SCCP layer 192 does not occur at the STP.

Such network implementations involving the use of signal transfer points are commonly deployed for a variety of reasons. One major reason involves the significant cost savings associated with running a single dedicated SS7 link from each MSC to one STP node, as opposed to requiring a dedicated SS7 link from each MSC to every other MSC and to every mobile service node (i.e., mesh configuration). Those skilled in the art of telecommunication networks will appreciate that this concept is fundamental to the nature and purpose of the SS7 network, and consequently the motivation and merit of such SS7 network connectivity will not be discussed in detail herein. In general, within the context of the network configurations described above, wireless network operators have discovered that fewer and shorter distance communication links tend to be less expensive to deploy and subsequently maintain.

It will also be appreciated by those skilled in the art of wireless telecommunication networking that as the volume of mobile subscribers increases and the range of services offered to these subscribers increases, the transaction rate capacity of the wireless network database services entities described above will also be required to increase correspondingly.

Therefore, what is needed is a system and method of deploying a wireless telecommunication network database services entities, such as an HLR, VLR, EIR, or AuC, that is easily scaleable, provides high message processing transaction rates, and minimizes communication link requirements.

DISCLOSURE OF THE INVENTION

According to one aspect, the present invention includes a communications network element that is capable of providing the message routing functionality of a Signal Transfer Point (STP) as well as the functionality typically provided by wireless service nodes. Such wireless or mobile service nodes include, but are not limited to, a Home Location Register, a Visitor Location Register (VLR), an Authentication Center (AuC), an Equipment Identity Register (EIR), a World Wide Web (WWW) translation server, and a Short Message Service (SMS) center. The mobile services routing node includes a communication module capable of transmitting and receiving data packets over a network. A discrimination process receives incoming data packets and subsequently directs certain packets to a mobile services database manager. The mobile services database manager facilitates access to an appropriately provisioned mobile service database process based on information contained within the data packets. Signaling message packets received by the mobile services routing node may result in the updating or modification of data contained within one or more of the mobile service database processes. Furthermore, mobile service database process may generate new messages, in response to the receipt of certain mobile service related signaling messages.

Accordingly, it is an object of the present invention to provide an STP-like routing node that is capable of performing the mobile service functions typically associated with a Home Location Register (HLR) node.

It is another object of the present invention to provide an STP-like routing node that is capable of performing the mobile service functions typically associated with a Visitor Location Register (VLR) node.

It is another object of the present invention to provide an STP-like routing node that is capable of performing the mobile service functions typically associated with an Equipment Identity Register (EIR) node.

It is another object of the present invention to provide an STP-like routing node that is capable of performing the mobile service functions typically associated with an Authentication Center (AuC) node.

It is another object of the present invention to provide an STP-like routing node that is capable of performing the mobile service functions typically associated with a Short Message Service (SMS) node.

It is another object of the present invention to provide an STP-like routing node that is capable of performing the mobile service functions typically associated with a World Wide Web (WWW) user ID/Mobile Identification Number (MIN) translation service node.

Some of the objects of the invention having been stated hereinabove, other objects will become evident as the description proceeds, when taken in connection with the accompanying drawings as best described hereinbelow.

BRIEF DESCRIPTION OF THE DRAWINGS

A description of preferred embodiment of the present invention will now proceed with reference to the accompanying drawings, of which.

DETAILED DESCRIPTION OF THE INVENTION

Figure 5:
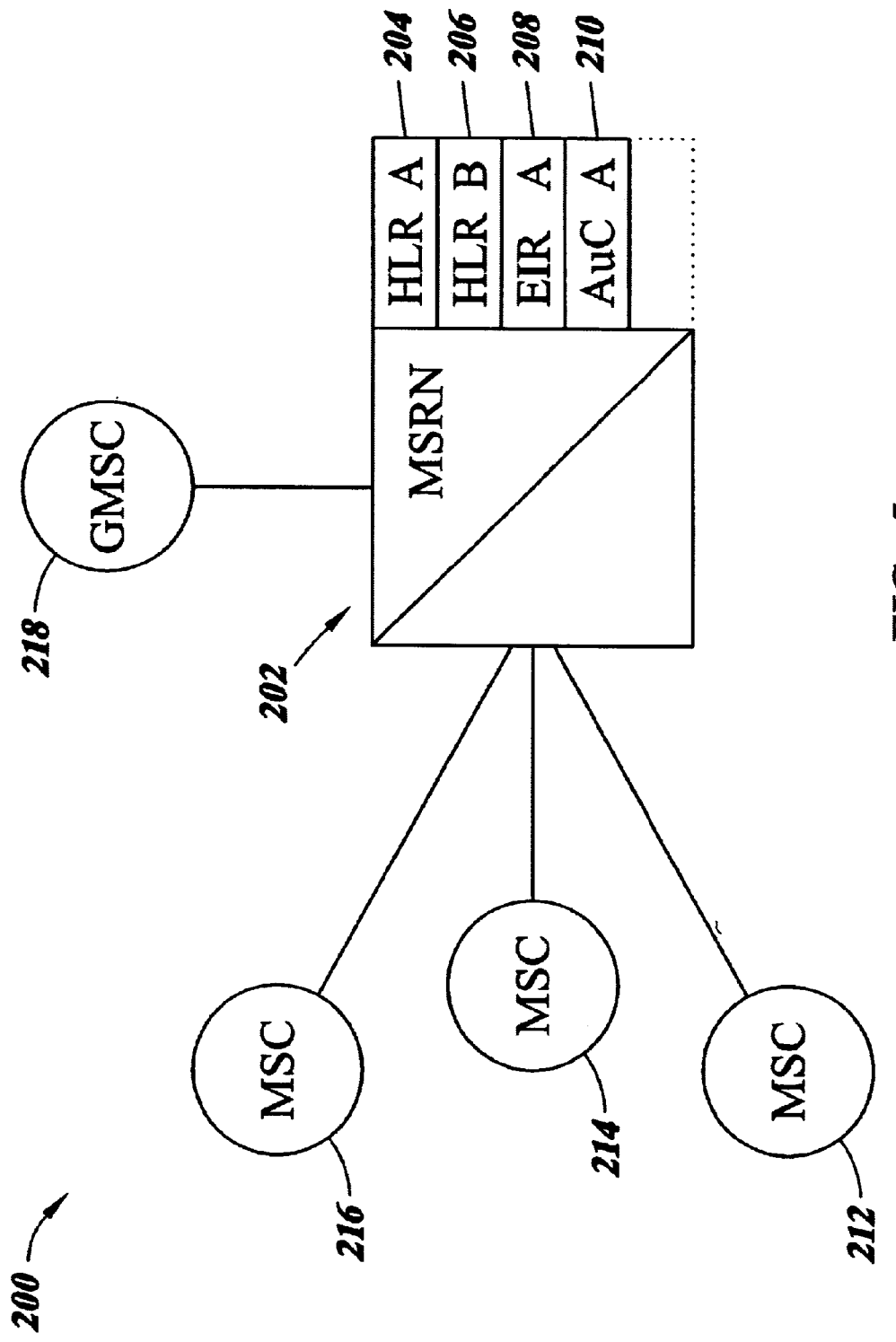
FIG. 5 is a diagram of an implementation of a mobile services routing node (MSRN) in a mobile telecommunications network according to an embodiment of the present invention.

Shown in FIG. 5 is a mobile communications network, generally indicated by the numeral 200, that includes a mobile services routing node (MSRN) 202 of the present invention. Mobile communications network 200 also includes a first mobile switching center (MSC) node 212, a second MSC node 214, a third MSC node 216, as well as a Gateway MSC (GMSC) node 218. Each of the MSC nodes and the GMSC node are connected to MSRN 202 via one or more signaling communication links. It will be appreciated that such signaling communication links could be configured to support Signaling System 7 (SS7)/Message Transfer Part (MTP), Internet Protocol (IP), Asynchronous Transfer Mode (ATM), or functionally similar communication protocols.

As further indicated in FIG. 5, MSRN 202 includes a plurality of mobile service processes that are integral with and generally contained within the node. More particularly, MSRN 202 includes a first Home Location Register (HLR) process 204, a second HLR process 206, an Equipment Identity Register (EIR) process 208, and an Authentication Center (AuC) process 210. As such, MSRN 202 is adapted not only to receive and route mobile call setup/teardown related signaling messages, but also to receive, process, and respond to certain mobile service related signaling messages.

Figure 6:
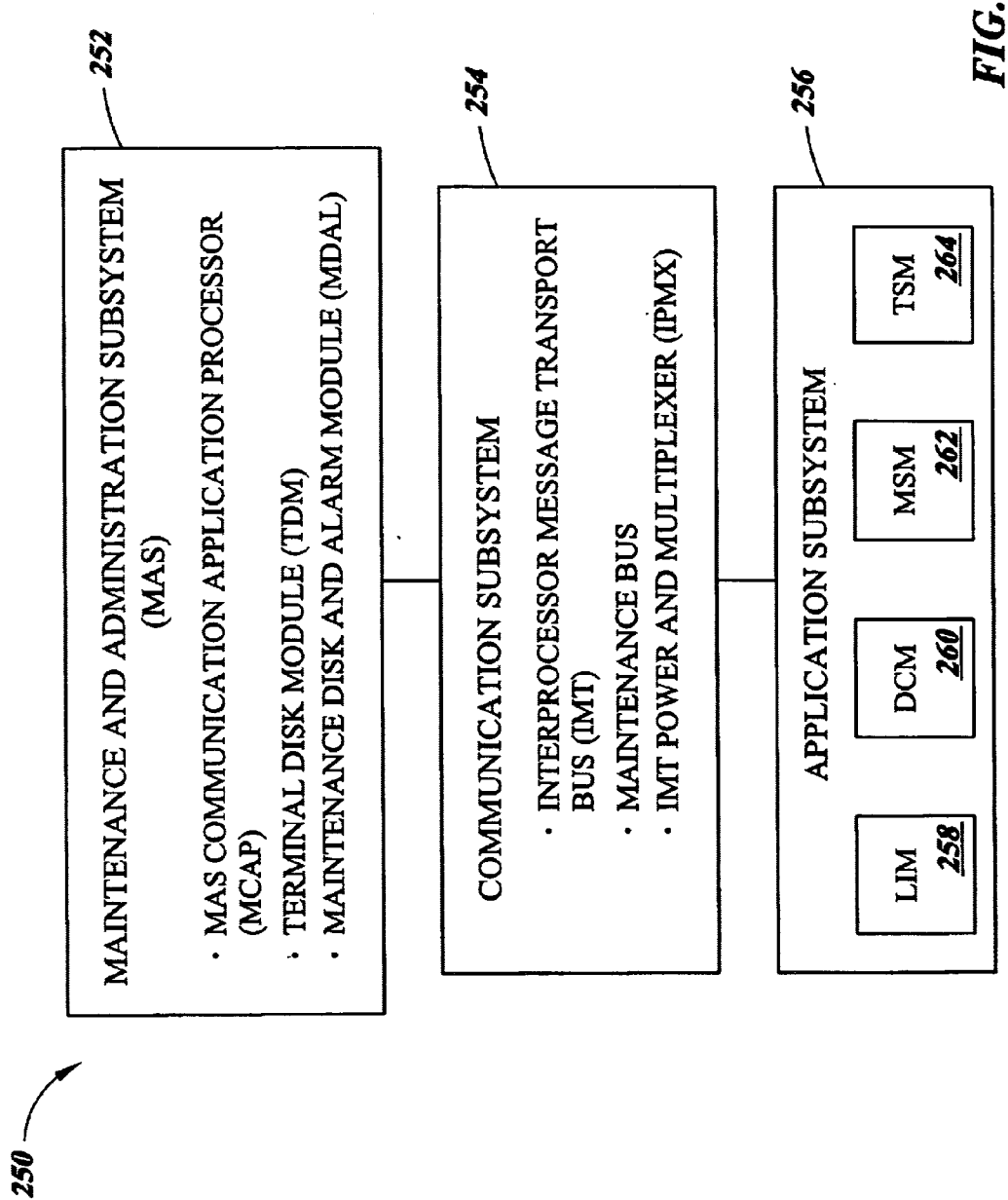
FIG. 6 is a schematic diagram of the internal architecture of one embodiment of a mobile services routing node of the present invention.

Shown in FIG. 6 is a block diagram of one embodiment of a mobile services routing node (MSRN) 250 of the present invention. In the preferred embodiment shown, mobile services routing node 250 employs an internal architecture similar to that of high performance STP and signaling gateway (SG) products which are marketed by the assignee of the present application as the Eagle® STP and IP7 Secure Gateway™, respectively available from Tekelec, Inc. of Calabasas, Calif. A detailed description of the Eagle® STP may be found in the Eagle® Feature Guide PN/910-1225-01, Rev. B, January 1998, published by Tekelec, the disclosure of which is hereby incorporated herein by reference. Similarly, a detailed description of the IP$^7$ Secure Gateway™ may be found in Tekelec publication PN/909-0767-01, Rev B, August 1999, titled Feature Notice IP$^7$ Secure Gateway™ Release 1.0, the disclosure of which is hereby incorporated by reference. As described in the above referenced Eagle® Feature Guide, an Eagle® STP 250 includes the following subsystems: a Maintenance and Administration Subsystem (MAS) 252, a communication subsystem 254 and an application subsystem 256. The MAS 252 provides maintenance communications, initial program load, peripheral services, alarm processing and system disks. The communication subsystem 254 includes an Interprocessor Message Transport (IMT) bus that is the main communication bus among all subsystems in the Eagle® STP 250. This high-speed communications system functions as two 125 Mbps counter-rotating serial buses.

The application subsystem 256 includes application cards that are capable of communicating with the other cards through the IMT buses. Numerous types of application cards can be incorporated into STP 250, including: a Link Interface Module (LIM) 258 that provides SS7 links and X.25 links, a Data Communication Module (DCM) 260 that provides a TCP/IP interface over Ethernet, and a Translation Service Module (TSM) 264 may also be provided to support triggered local number portability service. Once again, a detailed description of the Eagle® STP is provided in the above cited Eagle® Feature Guide and need not be described in detail herein. It should also be appreciated that, in addition to conventional SS7 LIM cards, the Data Communication Module (DCM) 260 can be employed in a similar manner to provide for the transport of Internet Protocol (IP) encapsulated SS7 messages over an IP network, as described in the above referenced Feature Notice IP$^7$ Secure Gateway™ Release 1.0 publication. A detailed description of the functionality of DCM 260 is described in PCT Publication Nos. WO 00/35155 and WO 00/35156 and in commonly-assigned copending U.S. patent application Ser. No. 09/588,852, the disclosures of which are incorporated herein by reference in their entirety. With particular regard to the TSM triggered LNP services module mentioned above, a detailed description of the Tekelec triggered LNP solution may be found in the Feature Guide LNP MSMS PN/910-1598-01, Rev. A, January 1998, published by Tekelec, the disclosure of which is hereby incorporated herein by reference.

Also shown in FIG. 6, and generally connected to the internal communication subsystem 254 is a Mobile Services Module (MSM) 262. MSM 262 is a novel feature of the present invention that is not described in any of the above-referenced publications. MSM 262 is adapted to maintain and support one or more mobile service database processes. Such processes may include, but are not limited to: a Home Location Register (HLR) process, a Visitor Location Register (VLR) process, an Equipment Identity Register (EIR) process, an Authentication Center (AuC) process, a Short Message Service (SMS) process, and a mobile subscriber ID-to-World Wide Web (WWW) user ID translation process. In the mobile subscriber ID-to-WWW user ID translation process, a mobile subscriber ID is in the form of a Mobile Subscriber Integrated Services Digital Network (MSISDN) or International Mobile Subscriber Identifier (IMSI) number and a World Wide Web user ID is in the form of a Uniform Resource Locator (URL) or an email address. A more detailed discussion of mobile services module function, operation, and implementation is provided below.

Mobile Services Routing Node (MSRN) Architecture

Figure 7:
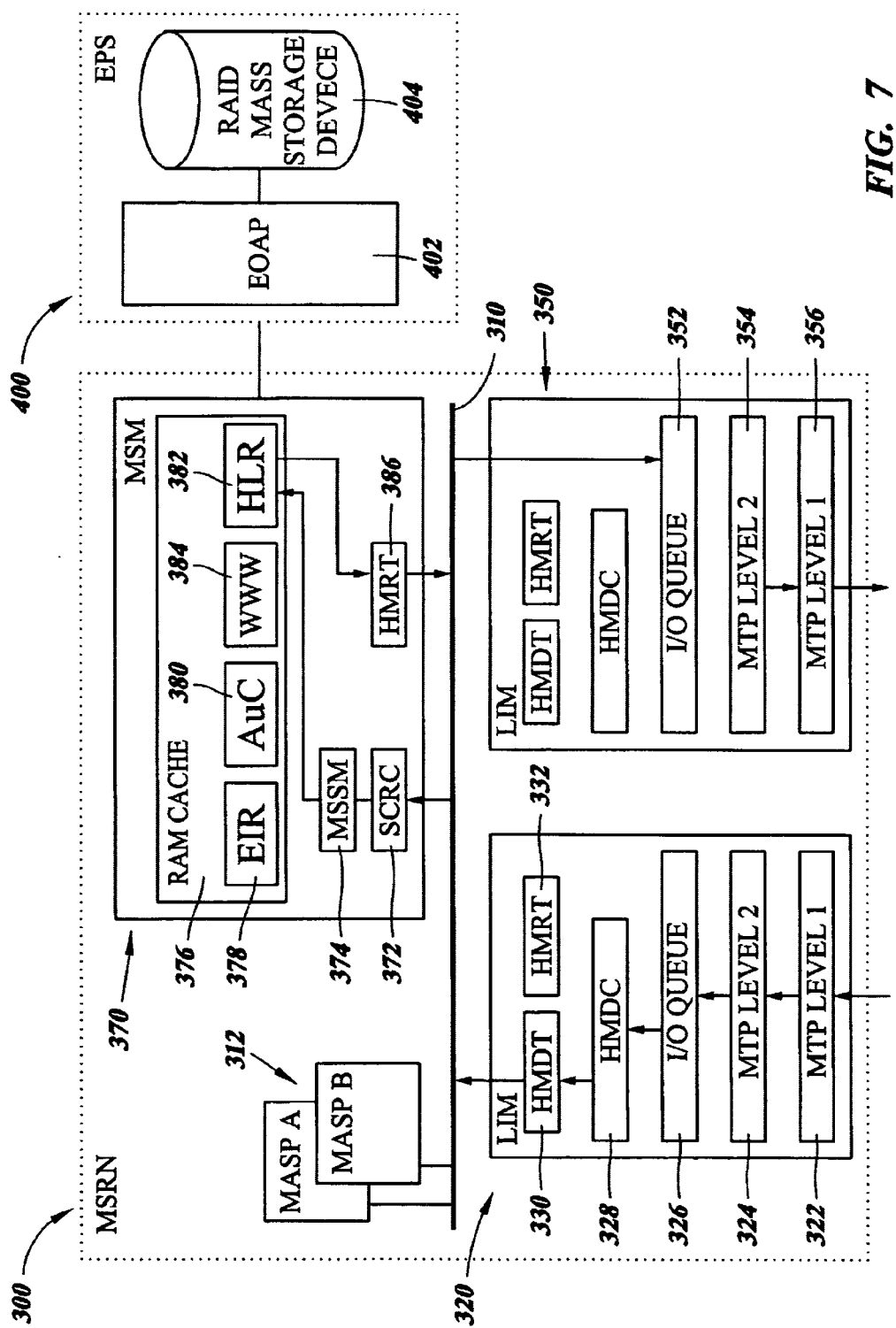
FIG. 7 is a schematic and message flow diagram associated with one embodiment of a mobile services routing node of the present invention.

Shown in FIG. 7 is a schematic diagram of a mobile services routing node (MSRN) of the present invention, which is generally indicated by the numeral 300. MSRN 300 includes a high speed Interprocessor Message Transport (IMT) communications bus 310. Communicatively coupled to IMT bus 310 are a number of distributed processing modules or cards including: a pair of Maintenance and Administration Subsystem Processors (MASPs) 312, a pair of SS7 capable Link Interface Modules (LIMs) 320 and 350, and an Mobile Services Module (MSM) 370. These modules are physically connected to the IMT bus 310 such that signaling and other type messages may be routed internally between all active cards or modules. For simplicity of illustration, only a single pair of LIMs 320 and 350 and a single MSM 370 are included in FIG. 7. However, it should be appreciated that the distributed, multi-processor architecture of the mobile services routing node 300 facilitates the deployment of multiple LIM, MSM, and other cards, all of which could be simultaneously active and connected to the IMT bus 310.

The modules and processes described with respect to FIG. 7 may be implemented in hardware, software, or a combination of hardware and software. For example, a module, as described herein may comprise a printed circuit board having a number of chips, such as a microprocessor and one or more memory chips, mounted thereon. The microprocessor may execute the mobile network service functions described herein. An exemplary microprocessor suitable for use with embodiments of the present invention is the x86 or Pentium® microprocessor available from Intel Corporation. In an alternative embodiment, each card or module may include one or more application-specific integrated circuits (ASICs) for performing the STP routing and mobile network service functions described herein. Either implementation or a combination of such implementations is intended to be within the scope of the invention. In addition, although certain functions are described herein as being implemented on separate modules, the present invention is not limited to such an embodiment. For example, in an alternative embodiment of the invention, some or all of the modules described herein may be implemented on a single circuit board having one or more processing circuits mounted thereon.

MASP pair 312 implement the maintenance and administration subsystem functions described above. As the MASP pair 312 are not particularly relevant to a discussion of the flexible routing attributes of the present invention, a detailed discussion of their function is not provided herein. For a comprehensive discussion of additional MASP operations and functionality, the above-referenced Tekelec publications can be consulted.

Focusing now on LIM card functionality, it will be appreciated that LIM 320 is comprised of a number of sub-component processes including, but not limited to an SS7 MTP level 1 process 322, an SS7 MTP level 2 process 324, an I/O buffer or queue 326, an SS7 MTP level 3 HMDC process 328, an HMDT process 330, and an HMRT process 332. MTP level 1 and 2 processes 322 and 324, respectively, provide the facilities necessary to send and receive digital data over a particular physical media/physical interface, as well as to provide error detection/correction and sequenced delivery of all SS7 message packets. I/O queue 326 provides for temporary buffering of incoming and outgoing signaling message packets. MTP level 3 HMDC process 328 receives signaling messages from the lower processing layers and performs a discrimination function, effectively determining whether an incoming SS7 message packet requires internal processing or is simply to be through switched. The HMDT process 330 handles the internal routing of SS7 message packets that require additional processing prior to final routing. Once again, it should be appreciated that a LIM card may contain more functional processes than those described above. The above discussion is limited to LIM functionality associated with the basic processing of in-bound signaling messages.

As such, it will be appreciated that the three functional processes associated with LIM 350 shown in FIG. 7 are simply those processes that are relevant to a discussion of out-bound LIM operation in the examples of mobile services routing node operation disclosed herein. The processes explicitly shown on the out-bound LIM 350 include an I/O queue 352 and MTP level 1 and 2 processes 356 and 354, respectively. I/O queue 352 facilitates temporary buffering of incoming and outgoing signaling message packets. MTP level 2 process 354 and an MTP level 1 process 356, respectively, provide the facilities necessary to send and receive digital data over a particular physical media/physical interface, as well as to provide error detection/correction and sequenced delivery of all SS7 message packets.

Mobile Services Module (MSM)

In general, an MSM card includes the database and database control processes necessary to provide and generally support the mobile services functionality of the mobile services routing node. The MSM 370 shown in FIG. 7 is comprised, in part, of an SCCP subsystem controller known as a Signaling Connection Routing Controller (SCRC) process 372, a Mobile Services Subsystem Manager (MSSM) process 374, a cache of dedicated high-speed random access memory (RAM) 376, which is used to support one or more mobile service processes or applications. More particularly, in the embodiment shown in FIG. 7, MSRN 300 is provisioned to support an Equipment Identity Register (EIR) process 378, an Authentication Center (AuC) process 380, a Home Location Register (HLR) process 382, and a World Wide Web (WWW) translation process 384. It will be appreciated that other mobile service processes such as Visitor Location Register (VLR) and Short Message Service (SMS) could also be simultaneously provisioned in MSRN 300. SCRC process 372 is responsible for discrimination of signaling messages at the SCCP level, and for distributing the signaling messages to a higher processing level when appropriate. In the configuration shown in FIG. 7, the next highest processing level is represented by the mobile services subsystem manager (MSSM) process 374. MSSM process 374 is responsible for determining which specific mobile service application is required for successful processing of a particular incoming signaling message packet. Again, as will be appreciated from FIG. 7, a number of mobile service applications may be simultaneously provisioned on a single MSM card. It will be further appreciated that an embodiment of an MSRN wherein only one mobile service application is provisioned would not necessarily require a separate MSSM process, as the functions typically performed by a MSSM could be included in the mobile service application process (MSAP) and/or in a LIM-based HMDC discrimination process. In one embodiment, MSSM process 374 examines the Subsystem (SSN) component of an SS7 point code—SSN address contained in a received mobile service signaling message. In general, such SSN numbers represent the address of a provisioned application at a given signaling node. In the case of an IS-41 based mobile service signaling message, a SSN value of 6 typically indicates that HLR service is required, a SSN value of 7 indicates that VLR service is required, a SSN value of 9 indicates that EIR service is required, a SSN value of 10 indicates that AuC service is required, and a SSN value of 11 indicates that SMS service is required. It will be appreciated that other SSN values may be "user defined" so as to indicate a new or non-standard mobile service, such as WWW translation service. It will also be appreciated that other mobile service identification schemes may be employed which are equally effective. For instance, in the revision C version of the IS-41 protocol, an MSC Identification Number (MSCIN) and Sender Identification Number (SIN) parameters may be used to perform the same addressing function as a conventional point code—subsystem type identifier.

MSM 370 also includes an HMRT process 386 that is responsible for the routing of any message packets generated by an appropriately provisioned mobile service application. That is, the HMRT process 386 determines to which LIM card a mobile service application generated signaling message packet should be routed for subsequent outbound transmission into the communication network.

It will be appreciated from FIG. 7 that MSM 370 is in communication with and serviced by an external provisioning system (EPS), generally indicated by the numeral 400, that further includes an external operations and administration processor (EOAP) 402 and an associated high-speed, fast access mass data storage device 404. In general, the EPS 400 provides a mobile network operator with a means to add data, remove data, update data, and generally provision the various mobile service applications that are maintained in the RAM cache 376. As such, EPS 400 serves as the interface between a mobile network operator and the MSRN mobile service database applications. In a typical implementation, an EPS receives and stores mobile service related information in the mass storage device 404 and then, in turn, is responsible for the controlled downloading this data to the appropriate mobile service applications which it services.

The EOAP subsystem 402 could be implemented in the form of a software application that executes on an industry standard, open systems platform, such as a Sun Microsystems workstation. In such a scenario, the EOAP platform and associated mass data storage system could be interfaced to a MSM card via a high speed Ethernet communication link.

As such external provisioning systems are commonly employed in the telecommunications industry for a variety of applications, a detailed discussion of such external provisioning system functionality will not be presented herein. It should suffice to state that the EPS 400 maintains the MSRN resident mobile service applications with the most current mobile service information available at any given time.

With regard to the specific mobile services provisioned on MSM 370, it will be appreciated that EIR application 378 contains the logic necessary to interpret an EIR related signaling message that is received from the mobile services subsystem manager (MSSM) process 374. Furthermore, EIR application 378 includes a database of mobile terminal-related data. Such mobile terminal data might include a listing of subscriber MSISDN or ISMI numbers and the mobile terminal electronic serial numbers (ESNs) associated therewith, as indicated in the sample EIR database 450 presented in FIG. 8. It will be further appreciated that EIR application or process 378 is also adapted to generate a new "reply" message in response to the receipt of certain EIR "query" messages. Such reply messages could include information that indicates whether a particular mobile terminal is stolen or perhaps is being fraudulently used, in which case, network service could be denied.

In a manner similar to that described above for EIR application 378, AuC application 380 contains the logic necessary to interpret an authentication related signaling message that is received from the mobile services subsystem manager (MSSM): process 374. AuC application 380 also includes complex mathematical algorithms that are used in conjunction with encryption and authentication key data to prevent fraudulent use of network resources. In essence, it is the responsibility of the AuC application 380 to verify and validate the identity of a mobile terminal that is requesting access to or utilizing network resources. In one particular IS-41-based authentication scheme, each mobile terminal is assigned or programmed with a secret authentication key (A-key). In general, A-key values are not known by customers or equipment distributors and are readable by only the mobile terminal manufacturer. Also programmed in the mobile terminal is a private encryption algorithm that is, again, readable only by the manufacturer. When a mobile subscriber attempts to gain access to network resources, a network authentication center sends the mobile terminal a public encryption key. The mobile terminal being authenticated evaluates its private encryption algorithm using both the received public key and it's private A-key. The value resulting from the encryption algorithm evaluation is subsequently transmitted back to the network authentication center where it is compared to an expected value. If the values match, authentication is considered successful and the mobile subscriber is permitted to access the desired network resources. If the values do not match, the mobile subscriber may not be permitted to access the network.

Figure 8:
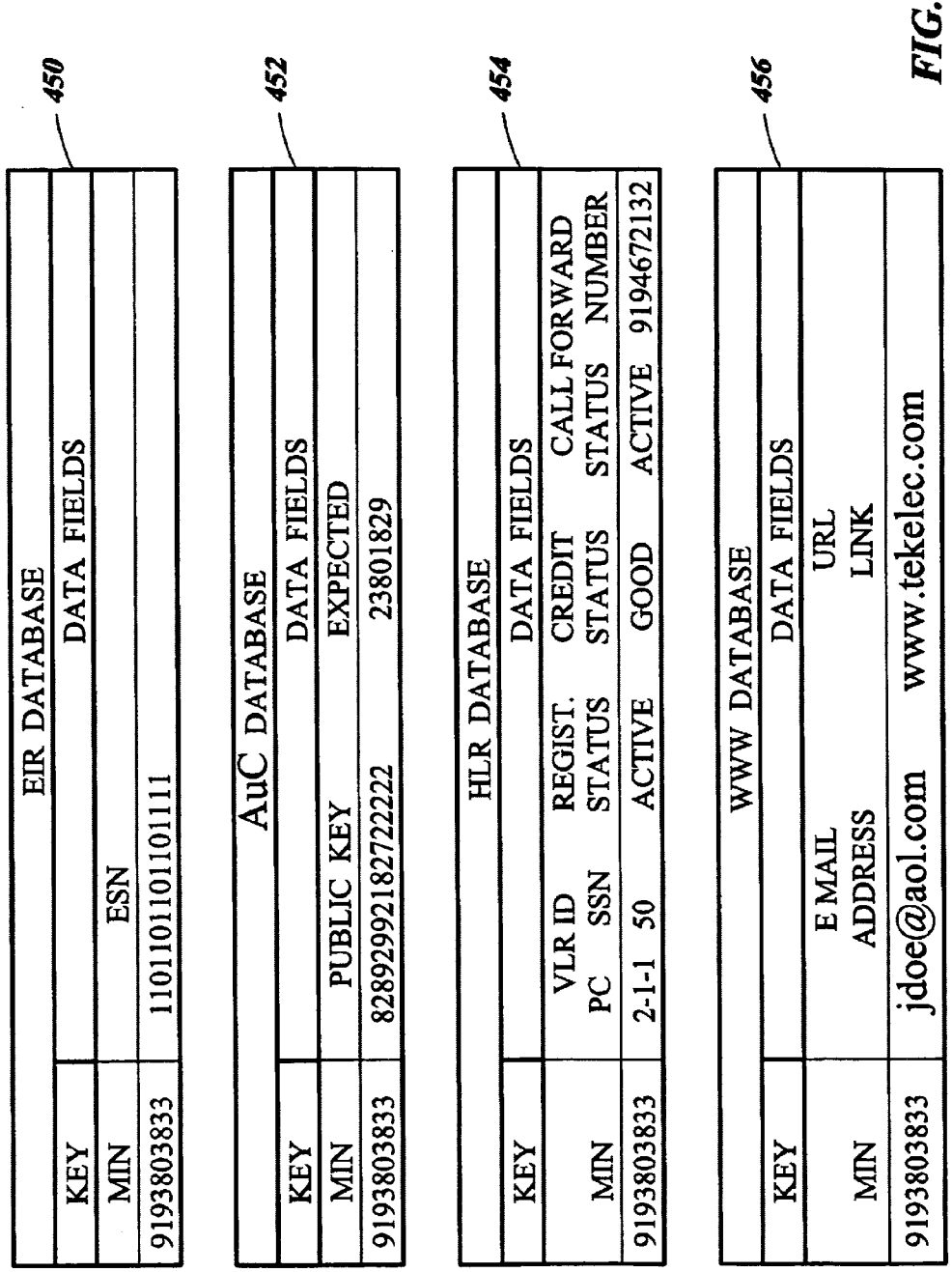
FIG. 8 is a table that illustrates sample mobile services database structures used in one embodiment of a mobile services routing node of the present invention.

With particular regard to the AuC application 380 that is shown in FIG. 7, it will be appreciated that in the simple authentication scenario described above, AuC application 380 further includes an authentication database process 452, an example of which is provided in FIG. 8. Authentication database 452 includes a listing of subscriber MSISDN or ISMI numbers with associated public key and expected mobile terminal response values. As such, it will be appreciated that AuC application 380 is also adapted not only to receive and process authentication requests but also to generate messages in response to the receipt of certain AuC related "query" messages.

The example authentication scheme and corresponding AuC database 452 is merely intended to illustrate the general function and concept of mobile terminal authentication. Any number of widely differing authentication schemes, requiring significantly different authentication database structures could easily be employed in a mobile services routing node of the present invention.

HLR application 382 contains the logic necessary to interpret an HLR service related signaling message that is received from the mobile services subsystem manager (MSSM) process 374. As discussed briefly above, it will be appreciated that HLR functionality supports: features required to maintain a uniform subscriber interface, signaling network access, delivery of incoming calls regardless of mobile subscriber location, subscriber roaming, usage measurements data collection, fraud protection service, and enhanced calling features. Accordingly, HLR application 382 also includes a database process 454 that can be easily provisioned to maintain and provide access to the mobile subscriber information that is required to implement such mobile services or functionality. It will be appreciated that the HLR database 454 shown in FIG. 8 is intended to represent a simplified HLR database structure. Depending upon the particular network and service requirements, such an HLR database process may be comprised of multiple data table structures. With particular regard to the example provided in FIG. 8, HLR database 454 includes a listing of subscriber MSISDN or ISMI numbers with associated VLR identification information (e.g., point code and subsystem), subscriber registration status, subscriber credit status information, and subscriber call forward service information.

In a manner similar to those mobile service applications described above, it will be appreciated that HLR application 382 is adapted not only to receive and process HLR related service requests but also to generate messages in response to the receipt of certain such HLR related service request messages.

WWW application 384 contains the logic necessary to interpret a WWW translation service related signaling message that is received from the mobile services subsystem manager (MSSM) process 374. As discussed briefly above, such WWW translation service could involve the translation of a called or calling party mobile identification number (e.g., MSISDN or IMSI) into a corresponding WWW-capable address, such as an email address or a URL address. Shown in FIG. 8 is a sample WWW database process 456 that comprises the WWW application 384. WWW database 456 includes a listing of subscriber MSISDN or ISMI numbers with associated subscriber email and URL address values. As such, it will be appreciated that WWW application 384 is also adapted not only to receive and process WWW translation requests but also to generate messages in response to the receipt of certain WWW related service messages. It will be further appreciated that WWW database 456 could also be configured to include a relationship between a mobile subscriber identification number (e.g., MSISDN or IMSI) and an Internet Protocol (IP) address and port number.

Sample MSM Message Flow For HLR Update

Continuing with FIG. 7, the path of a typical SS7 mobile service signaling message is traced from reception at the mobile services routing node (MSRN) 300 at the inbound LIM 320, through the mobile service administration process, and on to the outbound LIM 350. More particularly, the example presented in FIG. 7 and discussed in detail below involves processing associated with a hypothetical IS-41 LocationRequest Invoke type message. Such an IS-41 signaling message is generated when an MSC receives a request to place a call to a mobile subscriber. The MSC formulates a LocationRequest Invoke message to the HLR associated with the called mobile subscriber. The HLR is responsible for providing the MSC with sufficient information about the called mobile subscriber so as to permit the call to be completed. Such information is typically provided by the HLR in the form of a LocationRequest Return Result signaling message.

Figure 9:
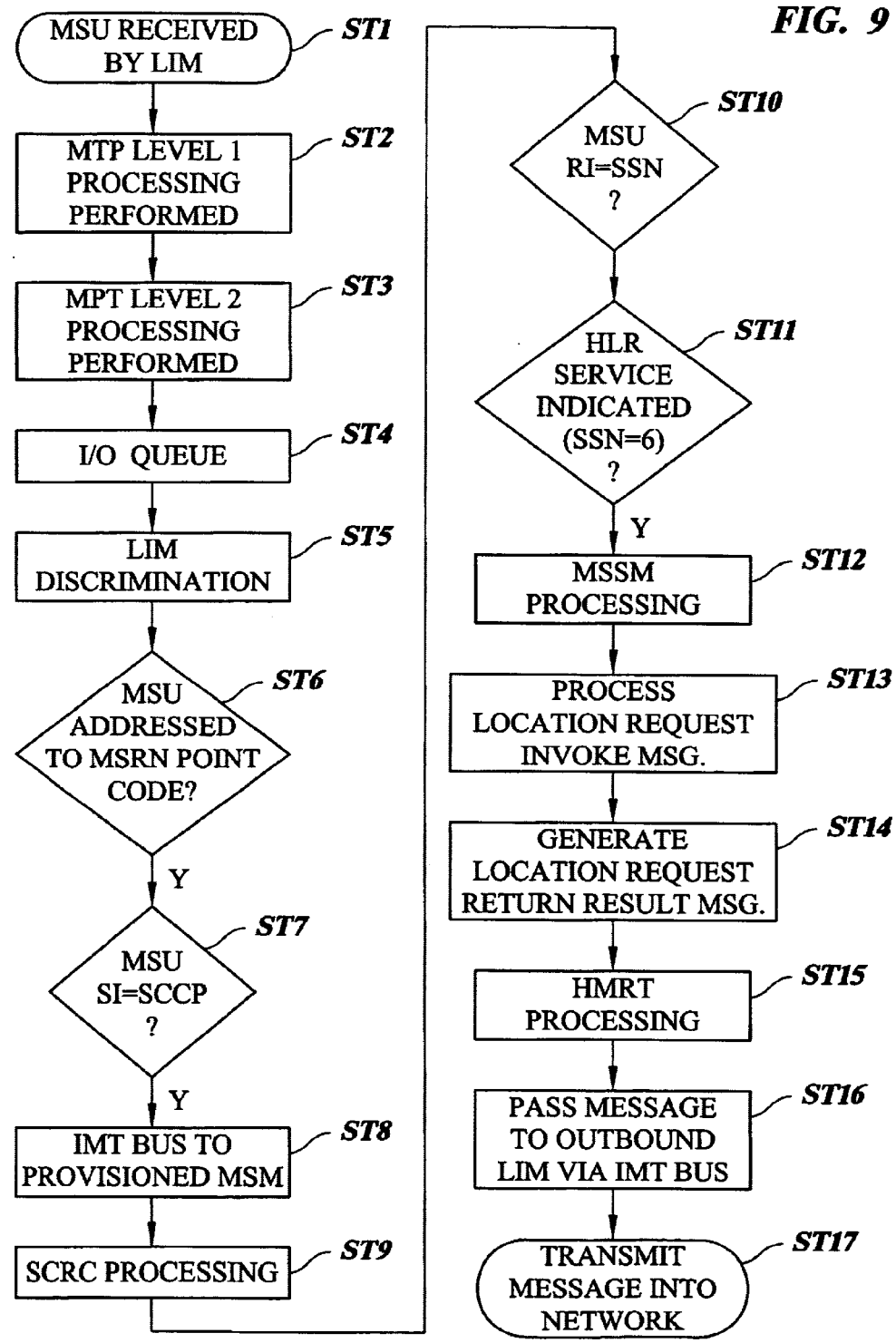
FIG. 9 is a flow diagram illustrating the processing of mobile service related signaling messages in a mobile services routing node of the present invention.

A detailed flow chart of HLR application related processing steps is presented in FIG. 9 and may be used in conjunction with the schematic diagram shown in FIG. 7 to better understand the general mobile service processing methodology.

Beginning with step ST1, an incoming LocationRequest Invoke (LRI) message in the form of an IS-41 MAP MSU is received at inbound LIM module 320. In steps ST2 and ST3, the incoming LRI message is received and processed by the MTP Level 1 and 2 processes 322 and 324, respectively. With MTP Level 1 and 2 processing complete, the signaling message packet is temporarily buffered in the I/O queue 326 (ST4) before being passed up the stack to the MTP Level 3 HMDC process 328 where SCCP type processing is performed (ST5). It will be appreciated by those skilled in the art of SS7 signaling that the SCCP portion of the LRI MSU includes a destination point code (DPC) field, a Called Party Routing Indicator (CdPA RI) field, and a Called Party Subsystem Number (CdPA SSN) field.

In the particular embodiment and example described herein, it is assumed that the destination point code (DPC) field value of the LRI message is set to the point code (PC) of the mobile services routing node (MSRN), the SCCP MSU Called Party Routing Indicator (CdPA RI) field is set to SSN, and the SCCP MSU Called Party Subsystem Number (CdPA SSN) field is set to the HLR SSN of the MSRN 300. It will also be appreciated that it is not essential that the DPC value contained in an incoming mobile signaling message be set to the PC of the MSRN. In alternate embodiments, an MSRN can be configured to intercept such MAP messages that are addressed to point codes other than it's own.

In the example shown in FIG. 7, HMDC process 328 examines the message packet and determines that the DPC of the packet is the PC of the mobile services routing node 300 (ST6). Consequently, further processing of the MSU within the MSRN node is assumed to be necessary, and the packet is passed to the HMDT process 330. HMDT process 330 examines the Service Indicator (SI) field of the MSU, which indicates that the message is of an SCCP type (ST7). As such, HMDT process 330 places the MSU on high speed IMT bus 310 for transport to MSM 370 and subsequent mobile service processing (ST8).

In step ST9, the LRI MSU is received and examined by SCRC process 372 that is resident on MSM 370. Given that the CdPA RI field of the SCCP portion of the MSU is set to SSN (ST10) and the CdPA SSN field of the SCCP MSU is set to the HLR subsystem of the MSRN node (ST11), SCRC process 372 forwards the LRI MSU to the mobile services subsystem manager (MSSM) process 374, as indicated by step ST12. In step ST13, MSSM process 374 examines the received LRI MSU and determines that the MSU requires HLR service and that HLR application 382 is available. Consequently, the LRI MSU is passed to HLR application 382 where it is processed.

As indicated in FIG. 7, HLR process 382 responds to the LocationRequest Invoke message by generating a new, LocationRequest Return Result (LRRR) message (ST14). This LRRR message contains information that is stored or is derived from information that is maintained in the HLR database process 454. The new LRRR MSU is passed from the originating HLR application 382 to the MSM-based HMRT process 386 (ST15). HMRT process 386 determines to which LIM card the LRRR message packet should be routed for subsequent outbound transmission. In this case, the HMRT process 386 determines that the desired outbound signaling link associated with the routing of the LRRR MSU is located on LIM 350. Consequently, the signaling message packet is internally routed across the IMT bus 310 to LIM 350, where it is generally received by the I/O queue process 352 (ST16). Eventually, the LRRR message packet is passed from the I/O queue 352 on to the MTP Level 2 and Level 1 processes 354 and 356, respectively and subsequently transmitted into the network (ST17). Once again, MTP level 1 and 2 processes 356 and 354, provide the facilities necessary to send and receive digital data over a particular physical media/physical interface, as well as to provide error detection/correction and sequenced delivery of all SS7 message packets transmitted into the SS7 network.

Again, it will be appreciated that the particular HLR example presented above is merely illustrative of the basic MSRN architecture and MSM processing methodology. Any number of mobile services could be simultaneously provisioned on a MSRN node, and the fundamental operation of the associated MSM-based mobile service applications would be similar to the sample HLR application scenario presented above. In fact, it will be appreciated that in the case of simultaneous provisioning of multiple mobile service applications on-board a single MSRN node, a response message generated by one mobile service application may be destined for another MSM-based mobile service application residing in the same MSRN node. Furthermore, an incoming signaling message received and processed by one MSM-based mobile service application may effectively trigger the generation of a new, related signaling message by another MSM-based mobile service application residing in the same MSRN node.

In any event, it will be appreciated that VLR, EIR, AuC, SMS, WWW and other mobile service applications could be implemented and operated in a manner similar to that described above for MSM-based HLR service.

Figure 1:
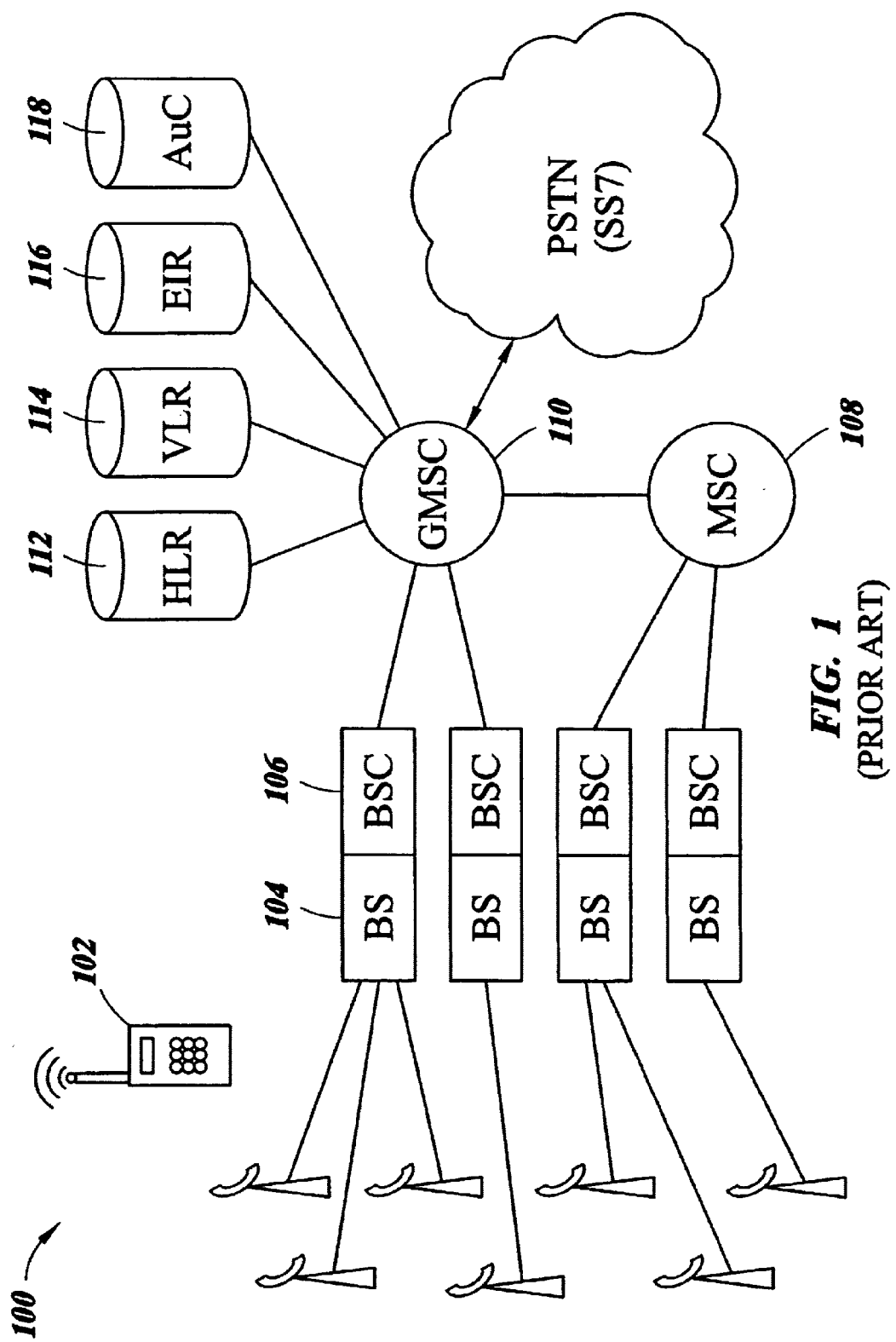
FIG. 1 is a diagram illustrating a prior art mobile telecommunications network architecture and associated network elements.
Figure 2:
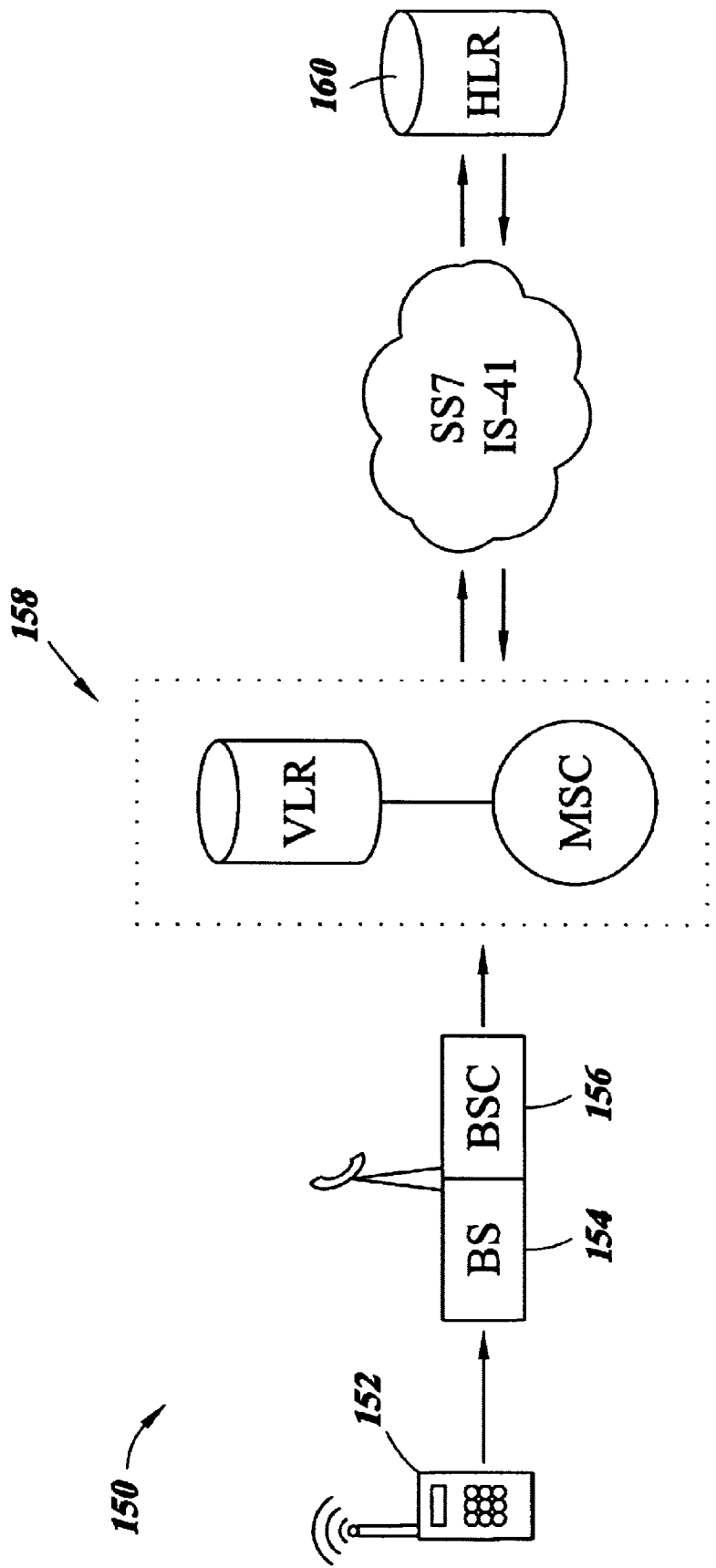
FIG. 2 is a diagram of a prior art mobile telecommunications network illustrating a typical mobile subscriber location update interaction.
Figure 3:
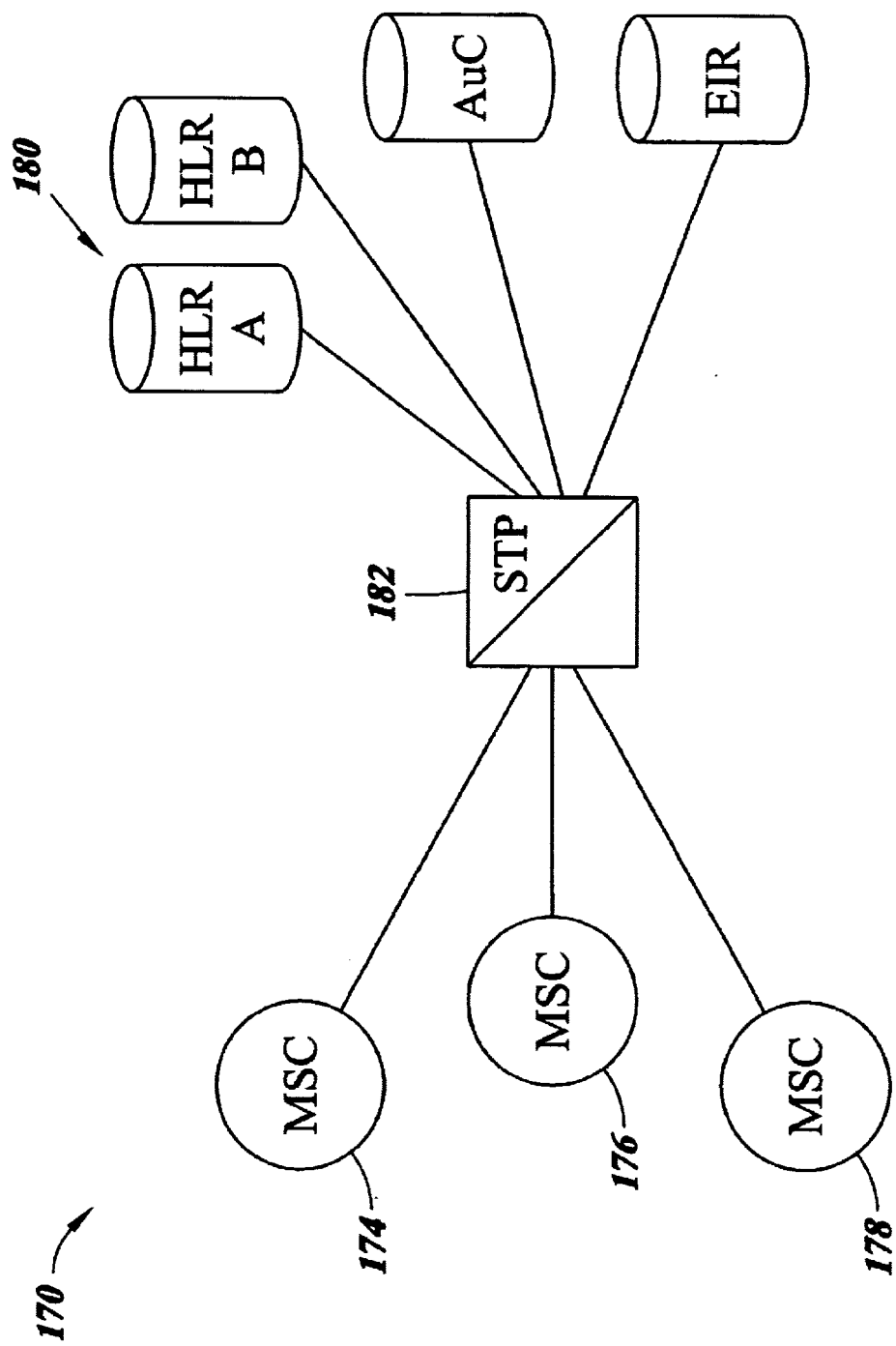
FIG. 3 is a diagram of a prior art mobile telecommunications network that includes a Signal Transfer Point (STP) routing node.
Figure 4:
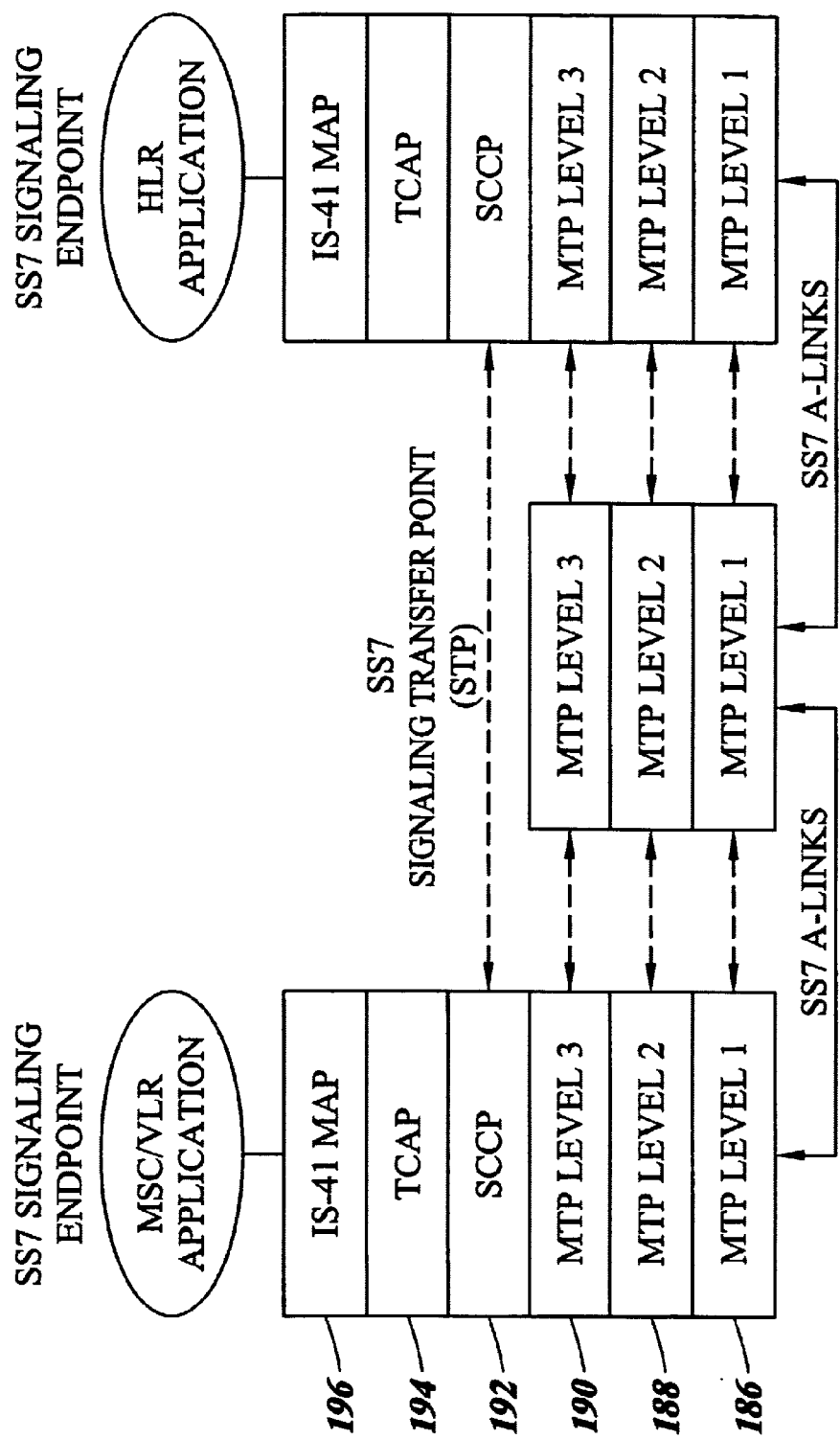
FIG. 4 is a block diagram of signaling protocol usage in a prior art mobile telecommunications network that includes an STP routing node.

In view of the protocol usage diagram presented earlier in FIG. 4, the unique functional characteristics of the mobile services routing node of the present invention can now be more fully appreciated. Previous to the MSRN of the present invention, STP nodes employed in mobile communication networks typically did not exploit or make use of information contained in those protocol layers above the SCCP level. The ability to interpret and process information contained in the IS-41 MAP level, while still performing STP-like routing functions, is a unique capability that allows a MSRN equipped mobile network operator to realize significant operational and economic advantages in the wireless telecommunications marketplace.

It will be understood that various details of the invention may be changed without departing from the scope of the invention. Furthermore, the foregoing description is for the purpose of illustration only, and not for the purpose of limitation—the invention being defined by the claims.

What is claimed is:

1. A network element for performing conventional Signal Transfer Point (STP) routing operations and additionally processing mobile service related signaling messages in a communications network, the network element comprising:

(a) a communication module for performing SS7 signal transfer operations for transferring signaling message between signaling links in a communications network;

(b) a mobile services module (MSM) including at least one mobile service application process (MSAP) for performing a mobile services function in response to a first signaling message received by the communication module, wherein the MSAP includes an Equipment Identity Register application process for verifying the identities of mobile terminals; and (c) a discrimination process for processing the first signaling message received by the communication module and subsequently directing the first signaling message to the MSM based on at least one parameter in the first signaling message.

2. The network element of claim 1 wherein the first signaling message is a Signaling System 7 (SS7) signaling message.

3. The network element of claim 2 wherein the Signaling System 7 (SS7) signaling message includes a Mobile Application Part (MAP).

4. The network element of claim 1 wherein the communication network is an Internet Protocol (IP) network carrying IP encapsulated SS7 Mobile Application Part (MAD) messages.

5. The network element of claim 1 wherein the communication module is a Signaling System 7 (SS7) Link Interface Module (LIM).

6. The network element of claim 1 wherein the communication module is an Internet Protocol (IP) Data Communication Module (DCM).

7. The network element of claim 1 wherein the MSM includes a mobile service subsystem manager (MSSM) for receiving the first signaling message and subsequently directing the first signaling message to one of a plurality of provisioned MSAPs.

8. The network element of claim 1 wherein the MSAP includes a Home Location Register application process for providing HLR service for a second signaling message requiring HLR service.

9. The network element of claim 1 wherein the MSAP includes a Visitor Location Register application process for providing VLR service for a second signaling message requiring VLR service.

10. The network element of claim 1 wherein the MSAP includes a World Wide Web translation application process for providing a mobile subscriber identity to WWW identity translation for a second signaling message requiring WWW translation service.

11. The network element of claim 1 wherein the MSAP is integral with and contained within the network element.

12. The network element of claim 1 wherein the MSAP is located on an external database server that is communicatively coupled to the network element.

13. The network element of claim 1 wherein the MSM includes a database for providing the mobile services function and the database is maintained in high speed, random access memory.

14. The network element of claim 1 wherein the MSM includes a database for providing the mobile services function and database is maintained on a high speed, optical disc storage medium.

15. The network element of claim 1 comprising an external MSAP provisioning system communicatively coupled to the MSM.

16. The network element of claim 15 wherein the external provisioning system includes an high speed, mass data storage device.

17. A network element for performing conventional Signal Transfer Point (STP) routing operations and additionally processing mobile service related signaling messages in a communications network the network, element comprising:

(a) a communication module for performing SS7 signal transfer operations for transferring signaling messages between SS7 signaling links;

(b) a mobile services module (MSM) including at least one mobile service application process (MSAP) for performing a mobile services function in response to a first signaling message received by the communication module; and (c) a discrimination process for directing the first signaling message to the MSM based on at least one parameter in the first signaling message, wherein the MSAP includes an Authentication Center (AuC) application process for providing AuC service for the first signaling message.

18. A network element for performing conventional Signal Transfer Point (STP) routing operations and additionally processing mobile service related signaling messages in a communications network, the network element comprising:

(a) a communication module for performing SS7 signal transfer operations for transferring messages between SS7 signaling links;

(b) a mobile services module (MSM) including at least one mobile service application process (MSAP) for performing a mobile services function in response to a first signaling message received by the communication module; and (c) a discrimination process for directing the first signaling message, to the MSM based on at least one parameter in the first signaling message wherein the MSAP includes a Short Message Service Center (SMSC) application process for providing SMSC service for the first signaling message.

19. A mobile services routing node comprising:

(a) a first communication module for performing SS7 message transfer part routing functions including transferring first SS7 messages between SS7 signaling links and forwarding second SS7 signaling messages to internal communications modules for further processing;

(b) a mobile services database for storing information for providing a mobile communications service; and (c) a mobile services application process receiving at least some of the second SS7 signaling messages and providing the mobile communications service based on the information contained in the mobile services database in response to the second SS7 signaling message, wherein the mobile services database includes an equipment identity register (EIR) database, the mobile services application includes an EIR Process, and the mobile communications service includes an EIR service.

20. The mobile services routing node of claim 19 wherein the mobile services database includes a home location register (HLR) database for storing information regarding home subscribers, the mobile services application process includes an HLR process, and the mobile communications service includes an HLR service.

21. The mobile services routing node of claim 19 wherein the mobile services database includes a visitor location register (VLR) database for storing information regarding visiting subscribers, the mobile services application process includes a VLR process, and the mobile communications service includes a VLR service.

22. The mobile services routing node of claim 19 wherein the mobile services database includes a world wide web (WWW) translation database for storing information for translating mobile subscriber information in the second call signaling messages to WWW address information, the mobile services application process includes a WWW translation service, and the mobile communications service includes a WWW translation service.

23. A mobile services routing node comprising:
(a) a first communication module for performing SS7 message transfer part routine functions including transferring first SS7 messages between SS7 signaling links and forwarding second SS7 signaling messages to internal communications modules for further processing;
(b) a mobile services database for storing information for providing a mobile communications service; and
(c) a mobile services application process receiving at least some of the second SS7 signaling messages and providing the mobile communications service based on the information contained in the mobile services database in response to the second SS7 signaling message, wherein the mobile services database includes an authentication center (AuC) database, the mobile services application process includes an AuC process, and the mobile communications service includes an AuC service.

24. A method for processing and routing mobile service related signaling message by a mobile services routing node (MSRN) in a communications network, the method comprising:
at a mobile services routing node including SS7 signal transfer functionality for transferring SS7 signaling messages between SS7 signaling links;
(a) receiving a first signaling message from a communication network;
(b) determining whether the first signaling message requires mobile service processing;
(c) in response to determining that the first signaling message requires mobile service processing, directing the first signaling message to a mobile service application process (MSAP) that is provisioned with the MSRN; and
(d) at the MSAP, providing a mobile communication service in response to the first signaling message, wherein providing a mobile communications service includes providing an equipment identity register (EIR) service.

25. The method of claim 24 wherein the first signaling message is a Signaling System 7 (SS7) signaling message.

26. The method of claim 24 wherein the Signaling System 7 (SS7) signaling message includes a Mobile Application Part (MAP).

27. The method of claim 24 wherein receiving a first signaling message from a communications network includes receiving the first signaling message from a Signaling System 7 (SS7) network.

28. The method of claim 24 wherein receiving a first signaling message from a communications network includes receiving the first signaling message from an Internet Protocol (IP) network carrying IP encapsulated SS7 Mobile Application Part (MAP) messages.

29. The method of claim 24 wherein receiving a first signaling message includes receiving a first signaling message addressed to a point code of the MSRN.

30. The method of claim 24 wherein determining whether the first signaling message requires mobile service processing includes examining information in the Service Indicator Octet (SIO) of the signaling message.

31. The method of claim 24 wherein determining whether the first signaling message requires mobile service processing includes examining information in a Service Connection Control Part (SCCP) layer of the first signaling message.

32. The method of claim 31 wherein examining the SCCP information includes examining a subsystem (SSN) value that identifies the type of mobile service required.

33. The method of claim 24 wherein providing equipment identity register service includes generating a mobile communications signaling message in response to the first signaling message.

34. The method of claim 24 wherein providing equipment identity register service at the MSAP includes forwarding the first signaling message to a second MSAP and generating a mobile communications message at the second MSAP.

35. The method of claim 24 comprising providing a home location register (HLR) service at the mobile services routing node for a second signaling message requiring HLR service.

36. The method of claim 35 wherein the second signaling message is a location request invoke message and wherein providing an HLR service includes performing a lookup in an HLR database located inside the MSRN and formulating a location request response message containing mobile subscriber information extracted from the HLR database.

37. The method of claim 24 comprising providing a visitor location register (VLR) service at the mobile services routing node for a second signaling message requiring VLR service.

38. The method of claim 37, wherein the second signaling message is a location request invoke message, providing a VLR service includes performing a lookup in a VLR database located inside the MSRN and formulating a location request response message containing mobile subscriber information extracted from the VLR database.

39. The method of claim 24 comprising providing a WWW translation service at the mobile services routine node for a second signaling message requiring VLR service.

40. The method of claim 39 wherein providing a WWW translation service includes performing a lookup in a WWW database located inside the MSRN and extracting WWW address information for a mobile subscriber based on information contained within the signaling message.

41. The method of claim 24 wherein the first signaling message is an EIR query message, and wherein providing an EIR service includes performing a lookup in an EIR database located inside the MSRN to determine whether a mobile handset associated with the EIR query is being fraudulently used and formulating an EIR response message to the EIR query message.

42. A method for processing and routing mobile service related signaling message by a mobile services routing node (MSRN) in a communications network, the method comprising:
at a mobile services routing node including SS7 signal transfer functionality for transferring SS7 signaling messages between SS7 signaling links;
(a) receiving a signaling message from a communication network;
(b) determining whether the signaling message requires mobile service processing;
(c) in response to determining that the message requires mobile service processing, directing the message to a mobile service application process (MSAP) that is provisioned with the MSRN; and (d) at the MSAP, providing a mobile communication service in response to the signaling message, wherein providing a mobile communications service includes providing an Authentication Center (AuC) service.

43. The method of claim 42 wherein the signaling message is an authentication request message and wherein providing an AuC service includes:

(a) performing a lookup in an AuC database based on the authentication request message;

(b) providing a response including a public encryption key to a mobile handset;

(c) receiving a response from the mobile handset; and (d) granting the mobile handset access to a mobile communications network in response to a value in the response from the mobile handset being equal to an expected value.

44. A method for processing and routing mobile service related signaling message by a mobile services routing node (MSRN) in a communications network, the method comprising:

at a mobile services routing node including SS7 signal transfer functionality for transferring SS7 messages between SS7 signaling links;

(a) receiving a signaling message from a communication network, (b) determining whether the signaling message requires mobile service processing;

(c) in response to determining that the message requires mobile service processing, directing the message to a mobile service application process (MSAP) that is provisioned with the MSRN; and (d) at the MSAP, providing a mobile communication service in response to the signaling message, wherein providing a mobile communications service includes providing a short message service.

45. The method of claim 44 wherein providing a short message service includes sending a short message service message to a mobile subscriber in response to the signaling message.

46. A network element for providing SS7 signaling transfer functionality and a plurality of different mobile services, the network element comprising:

(a) a link interface module located within the network element for transferring SS7 signaling messages from inbound SS7 signaling links to outbound SS7 signaling links and for identifying SS7 signaling messages requiring processing by a module internal to the network element;

(b) a mobile services subsystem manager process located within the network element for receiving the signaling messages identified as requiring further internal processing and for selecting a mobile service process application for processing each of the signaling messages; and (c) a plurality of different mobile service applications located within the network element for providing a plurality of different mobile services for the signaling messages identified by the mobile services subsystem manager as requiring mobile service processing.

47. The system of claim 46 wherein the mobile services applications include at least two of an equipment identity register application, an authentication center application, a home location register application, a world wide web translation application, a visitor location register application, and a short message service application.

* * * * *